3,457,236
PROCESS FOR THE PREPARATION OF HIGH MOLECULAR WEIGHT PREDOMINATELY HYDROXY TERMINATED ORTHO-PHTHALATE CONTAINING POLYESTERS
Wendell A. Ehrhart, Hellam, and Clarence E. Rohrer, Lititz, Pa., assignors to Armstrong Cork Company, Lancaster, Pa., a corporation of Pennsylvania
No Drawing. Filed Mar. 1, 1966, Ser. No. 530,773
Int. Cl. C08g 17/01
U.S. Cl. 260—75
6 Claims

ABSTRACT OF THE DISCLOSURE

A method of preparation for high molecular weight ortho-phthalate containing polyester resins. An excess of dihydric alcohol, of which at least 30 mol percent has a molecular weight less than 300, is reacted with dicarboxylic acid or anhydride, of which at least 30 mol percent is ortho-phthalic acid or anhydride. The reaction is initially carried out in the presence of an esterification catalyst to form a resin having a low acid number after which the reaction is continued at reduced pressure in the presence of an alcoholysis catalyst.

---

This invention relates generally to the preparation of essentially linear polyester resins and more particularly relates to an improved process for the preparation of ortho-phthalate containing polyesters of high molecular weight which are useful as intermediates for the production of a wide range of useful resins, plastics, and elastomers.

Ortho-phthalate containing polyesters are conventionally prepared by the one-stage "solvent cook" or "fusion cook" methods in which catalysts may or may not be used. In these methods the molar ratio of glycols to dicarboxylic acids charged is such that when the desired acid number is attained, the desired hydroxyl number (or viscosity) will also have been reached. Since some glycol is almost invariably lost, this ratio will generally be somewhat greater than the calculated ratio and must, therefore, be determined, for a given system, by trial and error. This slight excess over the calculated amount of glycol does little to enhance the rate of reduction of the acid number since the excess approaches zero as the desired acid number is approached. In the "solvent cook" method, water, formed upon esterification, is efficiently removed (thus driving the reaction toward completion) via azeotropic distillation with the solvent. Upon condensation, the water separates and most of the glycol and anhydride which had been vaporized are returned to the reaction zone along with the solvent. In the "fusion cook" method, water is removed via "blowing" with an inert gas. The vapors pass through an upright, heated partial condenser which condenses most of the glycol and anhydride, but allows the water to pass through. These methods are satisfactory when relatively low molecular weight polyesters are desired. To obtain high molecular weight polyesters, however, very small molar ratios of glycol to dicarboxylic acid must be used. This results in very low concentrations of both reactive species toward the end of the reaction, thus increasing the reaction time tremendously. The reaction time can often be reduced somewhat by removing the partial condenser ("fusion cook") in the latter part of the cook, thus allowing all volatile materials to escape. This, however, leads to poor yields and other difficulties. Preparation of high molecular weight, low acid number ortho-phthalate containing polyesters by such methods is a long, tedious and inefficient procedure (reaction times of up to 120 hours have been reported) and polyesters thus produced are generally very highly colored.

It is also known from U.S. Patent 3,079,368 to produce higher molecular weight ortho-phthalate containing polyesters than normal by what is basically a two-stage fusion process. In accordance with the disclosure of this patent, the first stage is carried out in the normal manner and without catalyst. Thus, a relatively low molecular weight, high acid number polyester is obtained. To this polyester is then added a "basic esterification catalyst" and the mixture is heated under a reduced pressure of from about 100 to 200 mm. Hg to increase the molecular weight. In this process the absence of a catalyst in the first stage and the relatively high pressures in the second stage results in long reaction times.

The primary object of this invention is to provide a process of obtaining ortho-phthalate containing polyesters of high molecular weight in which the first step allows rapid attainment of a very low acid number which in turn allows for higher temperatures and better vacuums in the second step without causing excessive losses or clogging due to phthalic anhydride sublimation. A further object of this invention is the provision of a method which reduces the reaction time necessary for forming high molecular weight polyester resins and which in addition provides for partial removal of cyclic structures which may be formed during the coarse of the reaction.

These and other objects of this invention will appear from the description along with certain particular embodiments of this invention which follows:

In accordance with this invention, the ortho-phthalate containing polyesters are prepared by a two-stage process which utilizes an esterification reaction to a low acid number at atmospheric pressure and then a molecular weight build-up by a predominantly alcoholysis reaction at reduced pressure. A catalyst or mixture of catalysts is used which will promote both the esterification and alcoholysis reactions, all or part of the catalyst or catalyst mixture being added prior to or during the first stage. A moderate excess of glycol is employed and, in general, the more difficult the esterification, the greater wil be the optimum excess of glycol.

During the first stage or esterification reaction, the water produced by the reaction is removed and any volatilized glycol and phthalic anhydride is returned to the reaction zone. Since a low acid number is obtained during the first stage, excessive losses of phthalic anhydride and clogging of vacuum lines by phthalic anhydride during the second stage is prevented and a low acid number in the final product is assured.

During the second stage or alcoholysis reaction, a relatively high vacuum, a reduced pressure of 0 to 100 mm. Hg, is employed to insure the continuous removal of the excess glycol as it is formed during the alcoholysis, thus rapidly building up molecular weight and lowering the hydroxyl number. Inert gases may be bubbled through the reaction mixture to assist in glycol removal. Since, generally for a given polyester, the molecular weight increases as the sum of the acid and hydroxyl numbers decrease, the polyesters prepared according to the instant invention are those of relatively high molecular weight.

The polyesters which may be advantageously prepared according to the method of the instant invention may be derived from any dihydric alcohol or mixtures thereof such as the glycols or mixtures of glycols commonly employed in direct polyesterifications. Likewise, any dicarboxylic acid or anhydride thereof or dicarboxylic acid mixture commonly employed in polyesterifications may be employed as the co-dicarboxylic acid with ortho-phthalic acid or its anhydride. The glycols and the co-dicarboxylic acids may be saturated or unsaturated. Since glycol must be removed during reaction, at least 30 mole percent of the glycols employed must have a molecular weight less than about 300. A list of some suitable glycols and dicarboxylic acids which, though incomplete, should be illustrative, follows:

| Glycols | Dicarboxylic acids |
|---|---|
| Ethylene glycol. | Malic acid. |
| Diethylene glycol. | Succinic acid. |
| Triethylene glycol. | Glutaric acid. |
| Tetraethylene glycol. | Adipic acid. |
| 1,2-propylene glycol. | Pimalic acid. |
| Dipropylene glycol. | Maleic acid. |
| Tripropylene glycol. | Maleic anhydride. |
| 1,3-propylene glycol. | Fumaric acid. |
| 1,3-butylene glycol. | Itaconic acid. |
| 1,4-butylene glycol. | Aconitic acid. |
| 1,5-pentane diol. | Isophthalic acid. |
| 1,6-hexane diol. | Terephthalic acid. |
| Glycerol monoallyl ether. | Tetrahydrophthalic acid. |
| Trimethylol propane monoallyl ether. | Cyclohexane dicarboxylic acid. |

As will be apparent to those skilled in the art, in order to vary the properties of polyesters produced in accordance with this invention, minor amounts of monofunctional and/or polyfunctional alcohols and/or carboxylic acids may be used in place of portions of the difunctional ingredients set forth above. Preferably an average functionality of approximately two (2) should be maintained by using proper equivalent ratios of monofunctional to polyfunctional ingredients to achieve high molecular weight polyesters and to prevent gellation. Other minor ingredients known to the art, such as oxidation and polymerization inhibitors may be added to the polyesterification mixture.

In the method described, the low acid number is attainable relatively rapidly in the first stage as this equilibrium reaction (esterification) is forced in the desired direction by the use of a catalyst, by efficient removal of one of the reaction products (water) and by maintaining an equivalent excess of one of the reactants (alcohol) throughout. This is accomplished with a sacrifice in molecular weight, i. e. the hydroxyl number will be higher than desired at the end of the first stage. The molecular weight is then built up rapidly in the second stage by forcing a second equilibrium reaction (alcoholysis) in the desired direction by using a catalyst and by efficiently removing one of the products (glycol). This reaction is apparently more rapid than is esterification since considerable time savings result by the use of this two-stage method.

Catalysts which have been found to be effective in the practice of this invention include zinc chloride and various compounds of tin, lead, titanium, and zirconium. It is impossible to say which is the most effective catalyst since relative catalytic activity may be reversed in changing from one given formulation to another. Catalysts which we have found particularly useful, however, include tetra-i-propyl- and tetrabutyl-o-titanates, titanium tetrachloride, stannous oxalate, stannous octoate, and zirconium naphthenate. These compounds are effective for both the esterification and alcoholysis reactions. The list is, of course, not exhaustive and other useful catalysts and/or catalyst combinations could obviously be used.

We have found that efficient water removal and efficient retention of glycol and phthalic anhydride during the first stage may be achieved by bubbling an inert gas through the well stirred reaction mixture and allowing this gas along with the volatiles from the esterification mixture to pass through a vertical, insulated efficient fractionating column. The rate of heating and/or the inert gas flow is adjusted such that the temperatures of the exit gases at the top of this column never climb above about 110° C. The ultimate reaction temperatures for the practice of this invention which may be employed in either stage range from about 170° to 280° C. and are usually in the range of 190° to 240° C. While the above is generally the most convenient laboratory method, it sometimes fails, due to clogging of the column with phthalic anhydride, in those instances where very high boiling point glycols are used and may be less practical on a large scale. In such instances, either a solvent cook may be employed for the first stage or a partial condenser may be employed which is held at a temperature such that phthalic anhydride will not solidify such as, for instance, a steam heated condenser at about 135° C.

The vacuum distillation utilized in the second stage is best accomplished through a heated or well insulated still head to prevent excessive reflux.

The unique combination of conditions and processes which comprises the method of the instant invention results in very substantial improvements in the time required for the preparation of o-phthalate containing polyesters of very low acid numbers and relatively low hydroxyl numbers. In addition, these polyesters generally have better color, may often be produced in better yields and generally contain less amounts of cyclic impurities than similar polyesters produced by prior art methods. With some glycols, very substantial amounts of monomeric cyclic o-phthalates have been found in vacuum distillates obtained during the preparation of 100% o-phthalate polyesters. In fact, in certain cases, if distillation is continued long enough at the proper temperature, the polyester can be almost completely converted to these macrocyclic esters as disclosed in my copending application entitled "Cyclic Esters of o-Phthalic Acid and a Glycol Ether," filed even date herewith. The discovery of these compounds derived from such readily available and economical chemicals would seem to be a direct result of the unique instant polyesterification process, especially insofar as cyclic esters, in some cases, crystallized from vacuum distillates and the crystals were not contaminated with phthalic anhydride. In some cases this codistillation of cyclic esters with excess glycol may reduce polyester yields significantly when using the instant polyesterification method. This is circumvented, however, by conducting the vacuum distillation through a suitable fractionating column so that the glycol distills selectively. Near the end of the distillation this column may, if desired, be removed or heated to above the boiling point of the cyclic ester to partially remove cyclic esters from the polyester. This gives a polyester with a low percentage of cyclic esters with minimal sacrifice in yield.

The following examples illustrate several embodiments of the invention.

EXAMPLE 1

(A) To a 3-liter, 5-necked flask was charged 1110 g. (7.5 moles) of phthalic anhydride, 1206 g. (9.0 moles) of commercial dipropylene glycol (Union Carbide Chemical Company) and 4.0 g. of tetrabutyl-o-titanate. The flask was equipped with asbestos cloth insulation, a heating mantle, mechanical stirrer, thermometer, gas inlet tube and a vacuum jacketed fractionating column (L.=48 cm., I.D.=1.5 cm.) filled with glass helices. A still head with thermometer and take-off condenser surmounted the fractionating column. Carbon dioxide was bubbled through the mixture at a rate of 1.8 liters/minute. The heating mantle and stirrer were turned on and the temperature was raised to and held at 220° C. As the temperature reached 180° C. water began to collect in a vented receiver beyond the take-off condenser. The rate of heat up was such that it required 45 minutes to go from 180° to 220° C. The temperature of the exit gases at the top of the fractionating column never exceeded 110° C. during this reaction. Seven hours after the temperature had reached 180° C. a sample was taken and the polyester was found to have an acid number of 2.1 (mg. KOH/g. sample). Thirty-five minutes later the flow of carbon dioxide was stopped, the fractionating column was replaced by an insulated still head and air condenser leading to a receiver in an ice bath and the flask was carefully evacuated to approximately 1 mm. of Hg. After 30 minutes of vacuum distillation the heating mantle was removed and atmospheric pressure was restored by bubbling in carbon dioxide. A small sample (Polyester 1–A) was withdrawn and the remainder allowed to cool to room temperature under carbon dioxide. The next day the flask and contents were reheated (under carbon dioxide) to 220° C., then immediately evacuated to approximately 1 mm. Hg. After 45 minutes at 220° C./1 mm. a second small sample (Polyester 1–A′) was taken (pressure restored by bleeding in carbon dioxide). The flask was then again evacuated and held at 220° C./1 mm. for an additional two hours and 35 minutes. At this point the mantle was turned off and dropped and the residual polyester (Polyester 1–A″) was poured out when the temperature had dropped to 180° C. Analytical data on the polyesters can be found in the following table.

(B) Another polyester (Polyester 1–B) was prepared from phthalic anhydride and dipropylene glycol via a procedure essentially identical to that for "Polyester 1–A" above except that the vacuum distillation was conducted for three hours at 215° C. through an insulated fractionating column. Maximum temperature of distilling vapors=75° C. as compared to 160° C. in the case of "Example 1–A." See the table for analytical data on "Polyester 1–B."

(C) For comparison a polyester similar to 1–A and 1–B was prepared via the conventional one-stage fusion cook method. Thus, 1110 g. (7.5 moles) phthalic anhydride, 1140 g. (8.5 moles) of dipropylene glycol and 4.0 g. tetrabutyl-o-titanate were charged to an apparatus identical to that use for the first stage of "Example 1–A." Carbon dioxide was bubbled in at a rate of 1.8 liters/minute; stirring was begun and the temperature was raised rapidly to and held at 220° C. Water began to distill at 190° C. and the upheat rate was such that 30 minutes were required for the temperature to rise from 190° to 220° C. After 17 hours (from the onset of distillation) the heating mantle was turned off and the polyester (Polyester 1–C) was allowed to cool to approximately 150° C. under $CO_2$ before removal from the flask. See the table for analytical data.

(D) For further comparison another polyester was prepared from 7.5 moles phthalate anhydride and 8.5 moles of dipropylene glycol via a procedure identical to that used to prepare "Polyester 1–C" except that no catalyst was employed. See the table for analytical data.

EXAMPLE 2

To a 5-liter, 5-necked flask equipped with the same accessories as the 3-liter flask used in "Example 1–A" was charged 1776 g. (12.0 moles) of phthalic anhydride, 1368 g. (15.2 moles) of 1,3-butylene glycol and 12.8 g. of tetrabutyl-o-titanate. Carbon dioxide was bubbled through this mixture at a rate of 0.78 liters/minute and the temperature was raised to and held at 220° C. When the temperature reached 145° C. some water began to distill. The upheat rate was such that it required 125 minutes to raise the temperature from 145° to 220° C. After 80 minutes at 220° C. the gas flow was increased to 1.8 liters/minute. Six hours after the first sign of distillation, a sample was taken and the acid number was found to be 3.31. At 7¼ hours vacuum distillation was commenced (see "Example 1–A" for apparatus changes, etc.) and was continued for 110 minutes at 220° C./1 mm. Hg during which time 233 g. of distillate had collected in the receiver. See the table for analytical data on this polyester (Polyester 2).

EXAMPLE 3

To an apparatus identical to that described in "Example 1–A" was charged 1036 g. (7.0 moles) of phthalic anhydride, 1005 g. (7.5 moles) of dipropylene glycol, 144 g. (0.9 mole) of trimethylolpropane monoallyl ether and 4.0 g. of tetrabutyl-o-titanate. Carbon dioxide was bubbled into this mixture at a rate of 1.8 liters/minute and the temperature was raised (stirring) to 220° C. and held. As the temperature reached 180° C. water began to collect in the receiver. The upheat rate was such that 55 minutes were required to raise the temperature from 180° to 220° C. Eight hours after the onset of distillation the heating mantle was turned off and the reaction mixture was allowed to cool (under carbon dioxide) to room temperature for overnight. The acid number at this point was 0.75. The next morning the flask and contents were reheated. When the temperature reached 120° C., the flask was evacuated to approximately 1 mm. Hg. Twenty minutes after evacuation the temperature had reached 160° C. and distillate began to collect in the receiver. Thirty more minutes elapsed before the maximum temperature of 220° C. was attained. Two hours after the onset of distillation the heating mantle was turned off and dropped. The distillate was found to weigh 296 g. and the polyester (Polyester 3) was allowed to cool to 150° C. under vacuum before removing it. See the table for the analytical data on this polyester.

EXAMPLE 4

To an apparatus similar to that described in "Example 1–A" was charged 1110 g. (7.5 moles) of phthalic anhydride, 954 g. (9.0 moles) of diethylene glycol and 4.0 g. of tetrabutyl-o-titanate. Carbon dioxide was bubbled through this mixture at a rate of 1.8 liters/minute, the stirrer was turned on and the temperature was raised to and held at 220° C. The upheat rate was such that it required 45 minutes to raise the temperature from 180° C. (the temperature at which water began to distill) to 220° C. A sample of the polyester was withdrawn 150 minutes after the onset of distillation and was found to have an acid number of 1.47. At 170 minutes the gas flow was stopped, the apparatus was modified as in "Example 1–A" and the flask was evacuated to approximately 1 mm. Hg. After 40 minutes of vacuum distillation (pot temperature=220° C.) the heating mantle was dropped and the polyester was allowed to cool to 150° C. under vacuum before pouring it from the flask. The analytical data for this polyester (Polyester 4) may be found in the table.

EXAMPLE 5

To an apparatus identical to that used in "Example 2" was charged 1778 g. (12.0 moles) of phthalic anhydride, 496 g. (8.0 moles) of ethylene glycol, 1050 g. (7.0 moles) of triethylene glycol, 5.7 g. zirconium naphthenate and 0.725 g. of t-butyl catechol. Carbon dioxide was bubbled through this mixture at the rate of 2.5 liters/minute and it was heated to and held at 220° C. As the temperature reached 120° C., water began to distill. At 188° C. the temperature of the distilling vapors at the top of the fractionating column started to climb above 100° C. To prevent glycol loss the gas flow was reduced temporarily to 0.775 liter/minute. Eighty minutes after the onset of distillation the temperature reached 220° C. Fifty minutes later the original gas flow rate was reestablished. Five and one-half hours after the onset of distillation, the mantle was turned off and the polyester allowed to cool for overnight. The acid number at this point was found to be 5.16. In the morning the apparatus was modified to allow vacuum distillation (see "Example 1–A"), the flask was evacuated to approximately 1 mm. Hg and the temperature was again raised to and held at 220° C. A reasonable rate of distillation had been attained by the time the temperature reached 180° C. and this was arbitrarily considered time zero for the vacuum distillation. Thirty-five minutes later the temperature had reached 220° C. After 185 minutes of vacuum distillation, the heating mantle was removed and the polyester was allowed to cool to 145° C. under vacuum before removing it from the flask. See the table for the analytical data on this polyester (Polyester 5).

EXAMPLE 6

(A) To an apparatus identical with that used in "Example 2" was charged 1480 g. (10.0 moles) of phthalic anhydride, 32.6 g. (3.33 moles) of maleic anhydride, 1228 g. (8.2 moles) of triethylene glycol, 460 g. (7.4 moles) of ethylene glycol and 7.2 grams of zirconium naphthenate. Carbon dioxide was then bubbled through the mixture at a rate of 1.8 liters/minute, the stirrer was turned on and the temperature was raised to and held at 220° C. The upheat rate was such that it required two hours and 40 minutes to raise the temperature from 150° C. (the temperature at which water began to distill) to 220° C. Six hours after the onset of distillation a sample was withdrawn, and found to have an acid number of 9.12. At 7½ hours the heating mantle was turned off and the polyester was allowed to cool to room temperature under carbon dioxide. After standing over the weekend, the polyester was reheated to 220° C. During the heatup, the apparatus was modified as before for vacuum distillation and as the temperature reached 140° C., the flask was evacuated to approximately 1 mm. Hg. A reasonable rate of distillation was obtained by the time the temperature reached 180° C., and this was arbitrarily considered time zero for the vacuum distillation. The upheat rate was such that it required 43 minutes to raise the temperature from 180° C. to 220° C. Vacuum distillation was continued for an additional 80 minutes (at 220° C.) and then the heating mantle was dropped and the polyester (Polyester 6–A) was allowed to cool to 145° C. under vacuum before pouring it from the flask. See the table for the analytical data on this polyester.

(B) To an apparatus identical with that used for the preparation of "Polyester 6–A" was charged 1480 g. (10.0 moles) of phthalic anhydride, 326 g. (3.33 moles) of maleic anhydride, 1162 g. (7.76 moles) of triethylene glycol, 434 g. (7.01 moles) of ethylene glycol and 7.2 g. of zirconium naphthenate. The heatup schedule, maximum temperature, carbon dioxide flow rate, etc., were essentially identical to those used for "Polyester 6–A." After 8½ hours reaction time, the heating mantle was turned off and the polyester allowed to cool under carbon dioxide and stand overnight. The following day the polyester was again heated to and held at 220° C. [(Reheat schedule identical to that for Polyester 6–A) (Carbon dioxide flow rate=1.8 liters/minute)]. Five hours and 5 minutes after the temperature had reached 180° C., the mantle was turned off and the polyester (Polyester 6–B) was allowed to cool to about 150° C. before pouring it from the flask. See the table for the analytical data on this polyester.

EXAMPLE 7

(A) To an apparatus identical with that used in "Example 1" was charged 444 g. (3.0 moles) of phthalic anhydride, 294 g. (3.0 moles) of maleic anhydride, 365 g. (2.5 moles) of adipic acid, 1060 g. (10.2 moles) of 1,5-pentanediol and 5.4 g. of stannous oxalate. The stirrer and heating mantle were turned on and the carbon dioxide flow rate was adjusted to 1.8 liters/minute. The temperature was then raised to and held at 200° C. Water began to distill as the temperature reached 165° C. and this was considered time zero. The heatup rate was such that 20 minutes were required to raise the temperature from 165° C. to 200° C. At four hours and 50 minutes reaction time, a sample was taken and the acid number found to be 2.4. At four hours and 55 minutes the flow of carbon dioxide was stopped and the apparatus modified and insulated as previously to allow vacuum distillation. This second stage was conducted at 200° C./0.5 mm. Hg for one hour and 25 minutes. After cooling to approximately 150° C. under vacuum, the polyester (Polyester 7–A) was removed from the flask. See the table for the analytical data on this polyester.

(B) To an apparatus identical with that used for "Example 7–A" were charged the same ingredients as employed in "Example 7–A." The amounts of these ingredients were also identical to the amounts employed in "Example 7–A" with the exception that only 980 g. (9.42 moles) of 1,5-pentanediol were employed. The heatup schedule, maximum temperature (200° C.) and carbon dioxide flow rate (1.8 liters/minute) etc., were essentially identical to those used for "Polyester 7–A." After 8½ hours reaction time, the heating mantle was turned off and the polyester allowed to cool under carbon dioxide. See the table for the analytical data on this polyester.

EXAMPLE 8

To an apparatus identical to that used in "Example 2" was charged 1795 g. (12.13 moles) of phthalic anhydride, 282.5 g. (2.88 moles) of maleic anhydride, 106.7 (0.375 mole) of stearic acid, 605.5 g. (9.76 moles) of ethylene glycol, 1089 g. (7.25 moles) of triethylene glycol, 117.2 g. (0.875 mole) of trimethylol-propane and 8.0 g. of zinc chloride. The carbon dioxide flow rate was adjusted to 0.5 liter/minute and the temperature was raised to and held at 215° C. (stirring). The upheat rate was such that the temperature rose from 180° C. (temperature at which distillation began) to 215° C. over a period of 45 minutes. As the pot temperature reached 215° C., the head temperature reached a maximum of 113° C. About 15 minutes later when the head temperature had fallen to 97° C., the gas flow rate was increased to 1.8 liters/minute. Five hours after the onset of distillation the acid number was found to be 3.42. At 5¼ hours the heating mantle was turned off and the polyester allowed to cool for overnight. The polyester was reheated (stirring) and as the temperature reached 180° C. the system was evacuated to approximately 2 mm. Hg. Distillation began almost immediately and accelerated as the temperature climbed to 215° C. (required 30 minutes). After 83 minutes at 215° C./approx. 2 mm. Hg, the mantle was turned off and the polyester was allowed to cool to 165° C. under vacuum before pouring it from the flask. The analytical data on this polyester can be found in the table.

TABLE

| Polyester No. | $\text{Eq.}-\text{C}\overset{\text{O}}{\underset{\text{OH}}{\diagdown}}$ Eqs. —OH | Catalyst (g./eq. acid) | Reaction time (mins.)[1] | Sum of A.N.&H.N. | Acid No. | Gardner color | Cyclic monomer content[2] percent |
|---|---|---|---|---|---|---|---|
| 1–A | 1.20 | Ti(OBu)₄ (0.266) | 485 | 21.0 | 0.22 | 2.0 | 4.3 |
| 1–A′ | 1.20 | Ti(OBu)₄ (0.266) | 530 | 12.9 | 0.48 | 3.5 | 4.0 |
| 1–A″ | 1.20 | Ti(OBu)₄ (0.266) | 685 | 5.2 | 0.24 | 7.0 | 3.7 |
| 1–B | 1.20 | Ti(OBu)₄ (0.266) | 635 | 22.6 | 1.10 | 3.0 | 7.4 |
| 1–C | 1.13 | Ti(OBu)₄ (0.266) | 1,002 | 32.1 | 1.81 | 4.0 | 6.9 |
| 1–D | 1.13 | None | 1,002 | 82.0 | 28.9 | 1.0 | 8.5 |
| 2 | 1.27 | Ti(OBu)₄ (0.533) | 545 | 15.4 | 1.67 | 1.0 | |
| 3 | 1.20 | Ti(OBu)₄ (0.286) | 600 | 12.1 | 0.10 | 4.0 | 1.5 |
| 4 | 1.20 | Ti(OBu)₄ (0.266) | 210 | 21.6 | 0.21 | 1.0 | |
| 5 | 1.25 | Zr(naph.)₄ (0.238) | 515 | 35.2 | 0.30 | 4.0 | |
| 6–A | 1.17 | Zr(naph.)₄ (0.270) | 572 | 32.5 | 0.59 | 9.0 | |
| 6–B | 1.11 | Zr(naph.)₄ (0.270) | 815 | 35.3 | 3.20 | 10.5 | |
| 7–A | 1.20 | SnC₂O₄ (0.318) | 380 | 32.8 | 0.40 | 4.0 | |
| 7–B | 1.11 | SnC₂O₄ (0.318) | 495 | 34.5 | 2.90 | 4.0 | |
| 8 | 1.21 | ZnCl₂ (0.264) | 428 | 29.3 | 1.30 | 8.0 | |

[1] Excluding heat up and cool down time.  [2] Assay by gas chromatography.

In the examples given above, the following polyesters were prepared by a conventional fusion cook process: 1–C, 1–D, 6–B and 7–B. All of the remaining polyesters were prepared in accordance with the improved process of this invention. In all cases the practice of this invention resulted in higher molecular weight polyesters for equivalent reaction times.

The polyesters which may be advantageously prepared according to the instant invention may be used as plasticizers for various plastics and as intermediates for the production of a wide range of useful resins, plastics and elastomers. Thus, either alone or as mixtures with various glycols, polyols, diamines, etc., they may be reacted with di- or polyisocyanates to prepare high molecular weight, generally crosslinked, infusible plastics or elastomers.

Those polyesters containing alpha-beta-ethylenic unsaturation such as maleate or fumarate containing esters may be converted to very high molecular weight, infusible products via mixing with a peroxide and heating in a closed mold. More particularly such polysters may be blended with vinyl monomers such as styrene, vinyl toluene, diallyl phthalate and the like and, in the presence of peroxides, acelerators, promoters and/or heat, converted into infusible polymers. Such polymers are often reinforced with glas fibers, etc., and used in the manufacture of boats, structural panels, and the like. The literature pertaining to compositions if this type is extensive since such "polyester resins" have attained considerable commercial importance. Although polyesters of relatively low molecular weight and high acid number are ordinarily used in such compositions, increasing the molecular weight and decreasing the acid number are known to effect improvements in flexural strength at elevated temperatures and in chemical resistance.

EXAMPLE 9

A 110 g. sample of "Polyester 6–A" was heated in a 110° C. oven for 30 minutes and 55 g. of vinyl toluene was blended into it. After cooling to room temperature, 0.22 ml. of cobalt tallate solution (6.0% Co), 0.11 g. of dimethylanaline and 1.84 ml. of Lupersol DDM (60% methylethyl ketone peroxides) were stirred in. This mixture was poured into a closed mold and allowed to stand at room temperature overnight. Upon demolding a clear, lightly colored, insoluble, infusible polymeric sheet was obtained. This sheet was tough and flexible having the feel of hard leather. Such polymeric material is useful for the manufacture of simulated leather goods, the manufacture of flexible decorative laminates, impregnated sheets, etc. Thus, printed papers and/or fabrics can be impregnated with the liquid premix and subsequent curing (optionally to some sort of backing) will produce washable wall paper, decorative countertop surfacing, etc.

EXAMPLE 10

A polyester of dipropylene glycol and phthalic anhydride was prepared using the instant polyesterification method, with 0.18% tetrabutyl-o-titanate catalyst. The polyester had a Gardner Color of 3, an acid number of 0.6 and a hydroxyl number of 23.0. A polyurethane prepolymer was prepared from 1052 g. of this polyester by heating it to 100° C. (stirring) in a reaction flask and adding 105.2 g. of toluene diisocyanate. The temperature of this agitated mixture was raised to 133° C. and the flask was evacuated to 10 mm. Hg. After 30 minutes at 133° C./10 mm. Hg, the heating mantle was dropped and the prepolymer poured into a can to cool. To 220 g. of this prepolymer (at 135 °C.) in a beaker was added 4.0 g. of molten trimethylolpropane. This mixture was stirred quickly and poured into an open preheated Teflon coated mold on a steam table (120° C.). After striking and flaming the mold and its already gelled contents were placed in a 125° C. oven overnight. Upon demolding, a hard, rigid, clear, light yellow, fairly tough, insoluble plastic was obtained. Another casting was similarly prepared except that 17.6 g. of butylbenzyl phthalate plasticizer was added to the prepolymer prior to casting. The resulting cured polymer was semiflexible. Plastics such as these are useful for encapsulation of electrical components.

We claim:
1. An improved process for the preparation of an essentially linear polyester resin in which (a) a member selected from the group consisting of a dihydric alcohol and mixtures thereof is reacted with (b) a member selected from the group consisting of a dicarboxylic acid, an anhydride of a dicarboxylic acid and mixtures thereof, and in which at least about 30 mole percent of (a) is a dihydric alcohol having a molecular weight of less than about 300 and in which at least about 30 mole percent of (b) is a member selected from the group consisting of o-phthalic acid and phthalic anhydride, which comprises:
   (1) heating a reaction mixture containing (a) and (b) together with an esterification catalyst until an acid number of less than about 10 is obtained while removing the water formed by the reaction, controlling the temperature of the exit gases formed during the reaction to insure that substantially all the volatized components of (a) and (b) are returned to the reaction mixture, and maintaining an equivalent excess of said alcohol in said reaction mixture during said reaction; and
   (2) continuing the heating of said reaction mixture under a reduced pressure of about 0 to 100 mm. Hg in the presence of an alcoholysis catalyst while continuously removing free alcohol as it forms by alcoholysis.

2. The method in accordance with claim 1 in which both the esterification and the alcoholysis reactions are carried out at a temperature in the range of from about 170° C. to about 280° C.

3. A method in accordance with claim 2 in which an inert gas is bubbled through the reaction mixture during the esterification reaction.

4. A method in accordance with claim 2 in which the acid number of the reaction mixture during the esterification step is reduced to less than about 5 and in which the hydroxyl number is reduced to less than about 70 during the alcoholysis reaction.

5. A method in accordance with claim 3 in which the acid number of the reaction mixture during the esterification step is reduced to less than about 5 and in which the hydroxyl number is reduced to less than about 70 during the alcoholysis reaction.

6. A method in accordance with claim 4 in which the alcoholysis reaction is carried out at a reduced pressure of 0 to 5 mm. Hg.

References Cited
UNITED STATES PATENTS

| | | |
|---|---|---|
| 2,437,232 | 3/1948 | Rothrock et al. |
| 2,961,430 | 11/1960 | Davis et al. |
| 3,079,368 | 2/1963 | Lundberg _____ 260—75 |

HAROLD D. ANDERSON, Primary Examiner

L. P. QUAST, Assistant Examiner

U.S. Cl. X.R.

260—22, 861